United States Patent
Lu et al.

(10) Patent No.: US 12,068,860 B2
(45) Date of Patent: Aug. 20, 2024

(54) METHOD FOR DATA RETRANSMISSION AND RELATED DEVICES

(71) Applicant: GUANGDONG OPPO MOBILE TELECOMMUNICATIONS CORP., LTD., Guangdong (CN)

(72) Inventors: Qianxi Lu, Guangdong (CN); Bingxue Leng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/471,697

(22) Filed: Sep. 21, 2023

(65) Prior Publication Data

US 2024/0014945 A1   Jan. 11, 2024

Related U.S. Application Data

(63) Continuation of application No. PCT/CN2021/135417, filed on Dec. 3, 2021.

(30) Foreign Application Priority Data

Apr. 2, 2021 (WO) ................ PCT/CN2021/085372

(51) Int. Cl.
  *H04L 1/1812* (2023.01)
  *H04L 1/08* (2006.01)
(52) U.S. Cl.
  CPC .............. *H04L 1/1812* (2013.01); *H04L 1/08* (2013.01)
(58) Field of Classification Search
  CPC ................................ H04L 1/1812; H04L 1/08

USPC ........................................................ 370/329
  See application file for complete search history.

(56) References Cited

U.S. PATENT DOCUMENTS

| | | | |
|---|---|---|---|
| 2020/0322095 | A1 | 10/2020 | Park et al. |
| 2022/0166558 | A1* | 5/2022 | Zhang ................... H04L 1/1816 |
| 2022/0346011 | A1 | 10/2022 | Hong |

FOREIGN PATENT DOCUMENTS

| | | |
|---|---|---|
| CN | 111756495 | 10/2020 |
| CN | 112399644 | 2/2021 |
| CN | 112543442 | 3/2021 |
| WO | 2021060786 | 4/2021 |

(Continued)

OTHER PUBLICATIONS

"3rd Generation Partnership Project; Technical Specification Group Radio Access Network; NR; Physical layer procedures for data (Release 16)," 3GPP TS 38.214, Sep. 2020, v16.3.0.

(Continued)

*Primary Examiner* — Mohammad S Anwar
(74) *Attorney, Agent, or Firm* — Hodgson Russ LLP

(57) ABSTRACT

A method for data retransmission and related devices are provided. The method includes the following. A first device receives first information from a second device, where the first information includes a hybrid automatic repeat request (HARQ) feedback indication. If the HARQ feedback indication is HARQ feedback enabled, the first device monitors data retransmission of the second device within a duration of a first retransmission timer. If the HARQ feedback indication is HARQ feedback disabled, the first device monitors the data retransmission of the second device within a duration of a second retransmission timer.

17 Claims, 8 Drawing Sheets

OBTAIN, BY FIRST DEVICE, FIRST INFORMATION FROM NETWORK OR PRE-CONFIGURED, WHERE FIRST INFORMATION INCLUDES HARQ FEEDBACK CHANNEL CONFIGURATION — S601

MONITOR, BY FIRST DEVICE, DATA RETRANSMISSION OF SECOND DEVICE BASED ON DURATION OF FIRST RTT TIMER AND/OR DURATION OF FIRST RETRANSMISSION TIMER IF HARQ FEEDBACK CHANNEL CONFIGURATION INDICATES THAT PSFCH IS CONFIGURED; AND MONITOR, BY FIRST DEVICE, DATA RETRANSMISSION OF SECOND DEVICE BASED ON DURATION OF SECOND RTT TIMER AND/OR DURATION OF SECOND RETRANSMISSION TIMER IF HARQ FEEDBACK CHANNEL CONFIGURATION INDICATES THAT NO PSFCH IS CONFIGURED — S602

(56) References Cited

FOREIGN PATENT DOCUMENTS

WO     WO-2021060786 A1 *   4/2021   .............. H04W 4/40
WO     WO-2022098202 A1 *   5/2022   ............ H04W 72/12

OTHER PUBLICATIONS

"3rd Generation Partnership Project; Technical Specification Group Radio Access Network; NR; Medium Access Control (MAC) protocol specification (Release 16)," 3GPP TS 38.321, Sep. 2020, v16.2.1.
LG Electronics, "New WID on NR sidelink enhancement," 3GPP TSG RAN Meeting #86, RP-193231 (revision of RP-193134), Dec. 2019.
Spreadtrum Communications, "Discussion on HARQ and related timers," 3GPP TSG-RAN WG2 Meeting #112-e, R2-2009140, Nov. 2020.
WIPO, International Search Report and Written Opinion for International Application No. PCT/CN2021/135417, Feb. 21, 2022.
OPPO, "Mode 1 resource allocation for NR SL," 3GPP TSG RAN WG1 #98bis, R1-1910373, Oct. 2019.
WIPO, International Search Report and Written Opinion for International Application No. PCT/CN2021/085372, Dec. 13, 2021.
LG, "Summary of email discussion [702][SLe] High-level principles for SL DRX (LG)," 3GPP TSG-RAN WG2 #113-e, R2-2101727, Jan. 2021.
EPO, Extended European Search Report for EP Application No. 21934629.3, Jul. 9, 2024.

* cited by examiner

METHOD FOR DATA RETRANSMISSION AND RELATED DEVICES

CROSS-REFERENCE TO RELATED APPLICATION(S)

This application is a continuation of International Application No. PCT/CN2021/135417, filed Dec. 3, 2021, which claims priority to International Application No. PCT/CN2021/085372, filed Apr. 2, 2021, the entire disclosures of which are incorporated herein by reference.

TECHNICAL FIELD

This disclosure relates to the field of network technology, and particularly to a method for data retransmission and related devices.

BACKGROUND

For a user equipment (UE)-universal mobile telecommunication system (UMTS) terrestrial radio access network (UE-UTRAN, Uu)-based discontinuous reception (DRX) mechanism, DRX is designed based on a feedback-based hybrid automatic repeat request (HARQ) retransmission mechanism, and therefore, DRX is implemented based on a round trip time (RTT) timer and a retransmission timer (retx timer), that is, a UE does not need to perform downlink (DL) monitoring before the RTT timer expires, and after expiry of the RTT timer, the UE performs DL monitoring before the retransmission timer expires. In release 16 (R16), a flexible HARQ feedback activation/deactivation mechanism is introduced for sidelink (SL). For the SL, a network device does not know whether a transmitting-end UE will activate HARQ feedback, which results in uncertainty regarding time interval of resource scheduling. In addition, for a receiving-end UE on the SL, since the receiving-end UE does not know a HARQ feedback activation/deactivation decision of the transmitting-end UE, the receiving-end UE does not know how to monitor data retransmission, which affects data transmission efficiency.

SUMMARY

In a first aspect, a method for data retransmission is provided in implementations of the disclosure. The method includes the following. A first device receives first information from a second device, where the first information includes a hybrid automatic repeat request (HARQ) feedback indication. If the HARQ feedback indication is HARQ feedback enabled, the first device monitors data retransmission of the second device within a duration of a first retransmission timer. If the HARQ feedback indication is HARQ feedback disabled, the first device monitors the data retransmission of the second device within a duration of a second retransmission timer.

In a second aspect, a method for data retransmission is provided in implementations of the disclosure. The method includes the following. A first device receives first information from a network or pre-configured, where the first information includes a HARQ feedback channel configuration. If the HARQ feedback channel configuration indicates that a physical sidelink feedback channel (PSFCH) is configured, the first device monitors data retransmission of a second device based on a duration of a first RTT timer. If the HARQ feedback channel configuration indicates that no PSFCH is configured, the first device monitors the data retransmission of the second device based on a duration of a second RTT timer.

In a third aspect, an apparatus for data retransmission is provided in implementations of the disclosure. The apparatus includes a processor, a memory storing program codes, and a transceiver. The processor is configured to execute the program codes stored in the memory to: cause the transceiver to receive first information from a network or pre-configured, where the first information includes a HARQ feedback channel configuration; and monitor data retransmission of a second device based on a duration of a first RTT timer if the HARQ feedback channel configuration indicates that a physical sidelink feedback channel (PSFCH) is configured; and monitor the data retransmission of the second device based on a duration of a second RTT timer if the HARQ feedback channel configuration indicates that no PSFCH is configured.

BRIEF DESCRIPTION OF THE DRAWINGS

In order to describe more clearly technical solutions of implementations of the disclosure or in the related art, the following will describe the accompanying drawings used for describing the implementations of the disclosure or the related art.

DETAILED DESCRIPTION

It should be understood that, the terms "first", "second", and the like used in implementations of the disclosure are used to distinguish different objects rather than describe a particular order. In addition, the terms "include", "comprise", and "have" as well as variations thereof are intended to cover non-exclusive inclusion. For example, a process, method, software, product, or device including a series of steps or units is not limited to the listed steps or units, and instead, it can optionally include other steps or units that are not listed or other steps or units inherent to the process, method, product, or device.

The term "embodiment" or "implementation" referred to in implementations of the disclosure means that a particular feature, structure, or characteristic described in conjunction with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

The term "at least one" in implementations of the disclosure refers to one or multiple, and the "multiple" refers to two or more.

The term "and/or" in implementations of the disclosure describes an association relationship between associated objects, and indicates that there may be three relationships, for example, A and/or B may mean A alone, both A and B exist, and B alone. A and B each may be a singular from or a plural form. The character "/" herein can indicate that the associated objects are in an "or" relationship. In addition, the symbol "/" may represent a divisor, i.e., perform a division operation.

The term "at least one (item) of" or the like in implementations of the disclosure refers to any combination of these items, including any combination of a single item or multiple items. For example, at least one (item) of a, b, or c can represent the following seven cases: a; b; c; a and b; a and c; b and c; a, b, and c. a, b, and c each may be an element or a set including one or more elements.

The "connection" in implementations of the disclosure refers to various manners of connection, such as direct connection or indirect connection, so as to implement communication between devices, which is not limited herein.

The terms "network" and "system" in implementations of the disclosure can be expressed as the same concept, and a communication system is a communication network.

Implementations of the disclosure will be described below with reference to the accompanying drawings in implementations of the disclosure.

Figure 1:
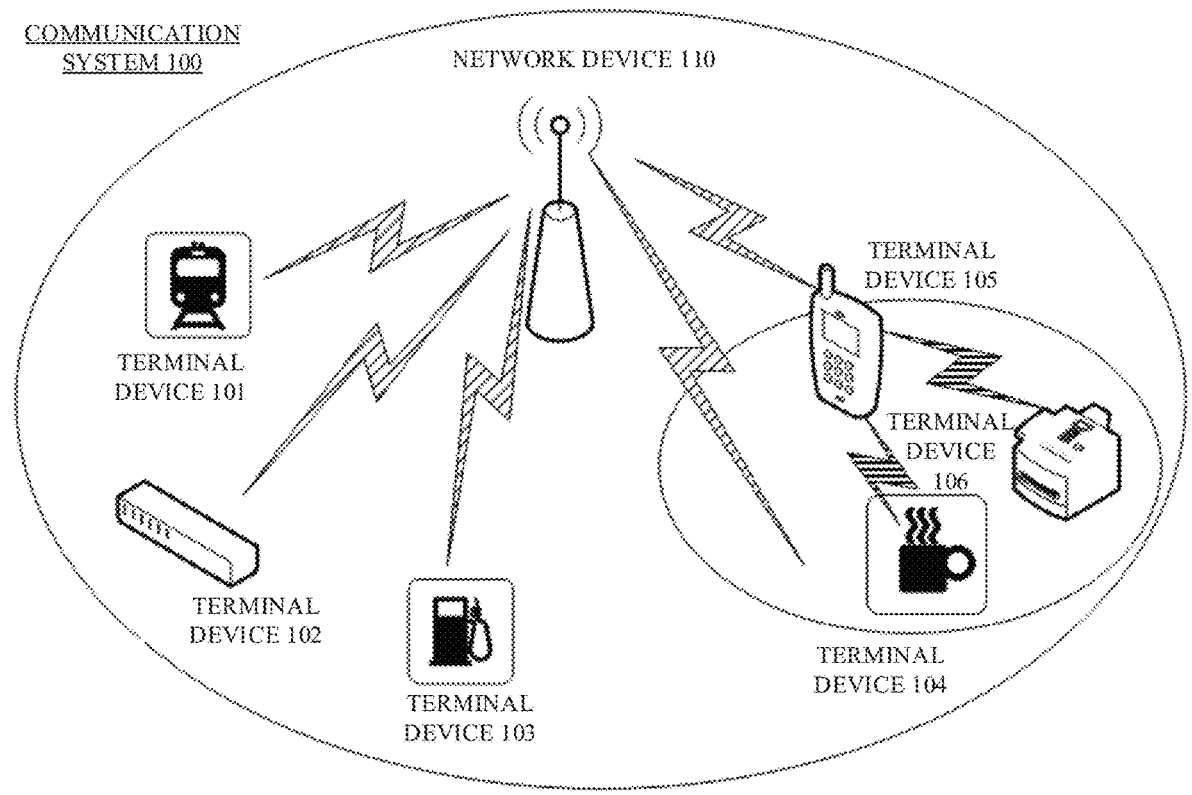
FIG. 1 is a schematic architectural diagram of a communication system provided in implementations of the disclosure.

As illustrated in FIG. 1, FIG. 1 is a schematic architectural diagram of a communication system 100 provided in implementations of the disclosure. The communication system 100 may include a network device 110 and terminal devices 101~106. It should be understood that, the communication system 100 to which the method according to implementations of the disclosure may be applied may include more or fewer network devices or terminal devices. The network device or the terminal device may be hardware, or software divided with regard to functions, or a combination thereof. The network device and the terminal device may communicate with each other via other devices or network elements. In the communication system 100, the network device 110 may transmit downlink (DL) data to the terminal devices 101~106, and the terminal devices 101~106 may also transmit uplink (UL) data to the network device 110. The terminal devices 101~106 each may be a cellular phone, a smartphone, a portable computer, a handheld communication device, a handheld computing device, a satellite radio apparatus, a global positioning system, a personal digital assistant (PDA), and/or any other suitable device for communicating over the wireless communication system 100, etc. The network device 110 may be a long-term evolution (LTE) network device and/or a new radio (NR) network device, and may specifically be a NodeB, an eNodeB, a base station in a $5^{th}$ generation (5G) mobile communication system, a next generation Node B (gNB), a base station in a future mobile communication system, or an access node in a wireless fidelity (Wi-Fi) system.

The communication system 100 may employ a public land mobile network (PLMN), vehicle to everything (V2X), a device-to-device (D2D) network, a machine-to-machine (M2M) network, an internet of things (IoT), or other networks. In addition, the terminal devices 104~106 may form a communication system in which the terminal device 105 can transmit DL data to the terminal device 104 or the terminal device 106. The method in implementations of the disclosure may be applied to the communication system 100 illustrated in FIG. 1.

The method in implementations of the disclosure may be applied to the communication system 100 illustrated in FIG. 1. A first device or a second device involved in the disclosure may be any one terminal device in the communication system. The following will take a user equipment (UE) as a terminal device for illustration.

Figure 2:
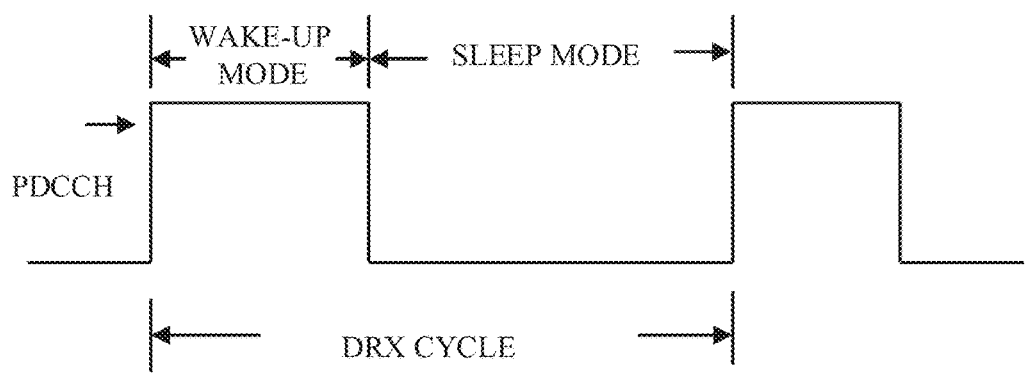
FIG. 2 is a schematic diagram illustrating a discontinuous reception (DRX) mechanism provided in implementations of the disclosure.

As illustrated in FIG. 2, FIG. 2 is a schematic diagram illustrating a discontinuous reception (DRX) mechanism provided in implementations of the disclosure. When in an active state (i.e. radio resource control (RRC) connected state), a UE starts an inactivity timer, and continuously attempts to receive a downlink control channel (i.e. physical downlink control channel (PDCCH)). If the UE receives scheduling downlink control information (DCI) on the PDCCH, the UE will restart the inactivity timer. If the UE does not receive any DCI within a time period and the inactivity timer expires, the UE will enter a DRX state. The basic time unit of the DRX state is a DRX cycle. The DRX cycle consists of a sleep period (i.e. opportunity for DRX) in a sleep mode and a wake-up period (i.e. on duration) in a wake-up mode. Sleep mode: the UE in the sleep mode can completely turn off communication devices such as a receiver and a baseband processor to reduce power consumption. Wake-up mode: after entering the wake-up mode of the DRX cycle, the UE is woken up and monitors a PDCCH, and once DCI is received on the PDCCH, the UE will restart the inactivity timer. If the UE does not receive any DCI in the wake-up mode (i.e. on duration) and the wake-up mode ends, or the UE receives the DCI but the inactivity timer expires, the UE will go back to the sleep mode.

With regard to a UE-universal mobile telecommunication system (UMTS) terrestrial radio access network (UE-UTRAN, Uu)-based DRX mechanism, the UE may monitor a PDCCH discontinuously according to a DRX configuration to realize power saving. If the PDCCH carries a radio network temporary identifier (RNTI) (such as cell RNTI (C-RNTI), cancellation indication RNTI (CI-RNTI), configured scheduling RNTI (CS-RNTI), interruption RNTI (INT-RNTI), slot format indication RNTI (SFI-RNTI), semi-persistent channel state information (CSI) RNTI (SP-CSI-RNTI)) corresponding to the UE, the UE may perform a corresponding DRX operation according to control information. A network device can control the DRX operation of the UE by configuring a series of parameters. For example, the UE is in a DRX active state in the following cases:

drx-onDurationTimer or drx-InactivityTimer is running; or drx-RetransmissionTimerDL or drx-RetransmissionTimerUL is running; or ra-ContentionResolution Timer or msgB-ResponseWindow is running; or a scheduling request (SR) is pending; or the PDCCH indicating a new transmission has not been received.

LTE V2X

LTE V2X is a D2D sidelink (SL) transmission technology. Different from a traditional cellular system in which communication data is received or transmitted by a base station, in a V2X system, D2D direct communication is adopted, which therefore has higher spectral efficiency and lower transmission delay. In the $3^{rd}$ generation partnership project (3GPP), two transmission modes are defined, which include mode A and mode B.

Figure 3A:
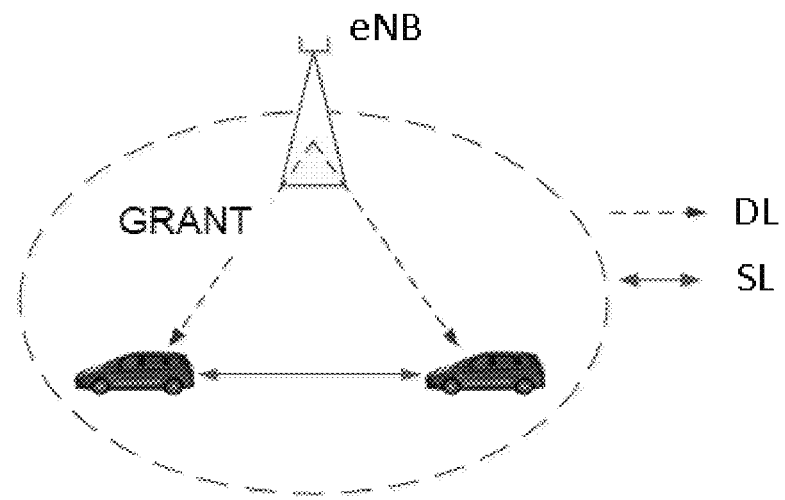
FIG. 3A is a schematic diagram illustrating resource scheduling provided in implementations of the disclosure.

Mode A: as illustrated in FIG. 3A, a transmission resource for a UE is allocated by a network device. The UE performs data transmission on an SL on the transmission resource allocated by the network device. The network device may allocate to the UE a resource for single transmission, or may allocate to the UE a resource for semi-persistent transmission.

Figure 3B:
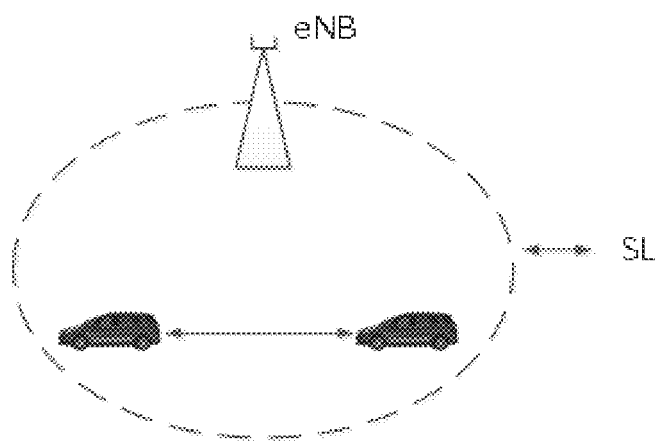
FIG. 3B is a schematic diagram illustrating another resource scheduling provided in implementations of the disclosure.

Mode B: as illustrated in FIG. 3B, the UE selects one resource for data transmission from a resource pool.

In 3GPP, D2D is studied in different phases.

(1) Proximity based service (ProSe): D2D communication in release 12/13 (Rel-12/13) is studied with regard to a ProSe scenario, which is mainly intended for public security services. In ProSe, time locations of a resource pool are configured, for example, the resource pool is non-consecutive in time domain, so that a UE can implement discontinuous transmission or reception of data on an SL, thereby realizing power saving.

(2) V2X: In Rel-14/15, a V2X system is studied with regard to a vehicle-to-vehicle (V2V) communication scenario, and is mainly intended for V2V communication services and vehicle-to-pedestrian (V2P) communication services with relatively high-speed movement. In V2X, since an in-vehicle system can continuously supply power, power efficiency is not a major issue. However, delay of data transmission is a major issue, and therefore, when designing a system, a UE is required to support continuous transmission and reception.

(3) Further-enhanced D2D (FeD2D): In Rel-14, this scenario is studied with regard to access of a wearable device to a network via a UE, and is mainly intended for a low-speed movement scenario and a low-power access scenario. In FeD2D, in a pre-research stage, it is concluded by 3GPP that a network device may configure a DRX parameter for a remote UE via a relay UE. However, since the project does not yet enter a standardization stage, there is no conclusion on specific details regarding how to perform DRX configuration.

NR V2X

On the basis of LTE V2X, NR V2X not only can be applied to a broadcast scenario, but also can be applied to a unicast scenario or a groupcast scenario. Similar to LTE V2X, two resource grant modes (mode A and mode B) are defined in NR V2X. In addition, a UE can obtain a time-frequency resource in mode A or mode B. The time-frequency resource may be indicated by an SL grant, i.e. the SL grant is indicative of a time-frequency location of a corresponding physical sidelink control channel (PSCCH) resource and physical sidelink shared channel (PSSCH) resource.

Different from LTE V2X, in NR V2X, besides no-feedback hybrid automatic repeat request (HARQ) retransmission that is initiated by the UE autonomously, feedback-based HARQ retransmission is introduced, and is applied to unicast communication and groupcast communication. Similar to LTE V2X, in NR V2X, since an in-vehicle system can continuously supply power, power efficiency is not a major issue. However, delay of data transmission is a major issue, and therefore, when designing a system, the UE is required to support continuous transmission and reception.

In NR-V2X communication, some new features are introduced, such as support for a large number of aperiodic services, an increasing number of retransmissions, and a more flexible resource reservation period. These features have a great influence on autonomous resource-selection mode of the UE. Therefore, a resource selection scheme applicable to NR-V2X is discussed and designed by 3GPP, and is denoted as mode 2.

In mode 2, the UE selects from a resource pool a resource that is not reserved by other UEs or is reserved by other UEs but low in received power by decoding sidelink control information (SCI) sent by other UEs and measuring SL received powers. For NR-V2X, a resource selection method in mode 2 mainly includes two steps, i.e. the UE firstly determines a candidate resource set, and then selects a resource from the candidate resource set to transmit data.

Step 1, the UE determines a candidate resource set.

Firstly, the UE takes all available resources in a resource selection window as resource set A, and then the UE determines, according to a sensing result for a resource sensing window, whether a resource is reserved by other UEs. The UE performs resource exclusion according to a slot not monitored and the first SCI monitored. After resource exclusion is completed, if the number of remaining resources in resource set A is less than a certain percentage, the UE increases a reference signal received power (RSRP) threshold by 3 decibels (dB), and repeats step 1 until the number of remaining resources in resource set A is greater than or equal to the percentage. Compared with a fixed percentage of 20% in LTE-V2X, the value of the percentage in NR-V2X is more flexible, and may be 20%, 35%, or 50%. The value may be in the unit of resource pool and configured by a network or pre-configured. Finally, resource set A subject to resource exclusion is the candidate resource set for the UE.

Step 2, the UE selects a transmission resource from the candidate resource set.

The UE randomly selects one or more transmission resources from resource set A with an equal probability. It should be noted that, when selecting the multiple transmission resources, the following time-domain restrictions need to be satisfied. (1) After removing some exception, the UE shall ensure that a retransmission resource selected can be indicated by the first prior SCI. The exception above includes the following: after resource exclusion, the UE cannot select a resource that satisfies the time-domain restriction from resource set A. Due to factors such as resource pre-emption, congestion control, and collision with an UL service, the UE drops transmission, and as a result, a transmission resource for a certain retransmission is not indicated by the first prior SCI. (2) The UE shall ensure that for any two time-frequency resources selected, if HARQ feedback is required for the previous transmission resource in the two time-frequency resources, the two resources are spaced apart by at least interval Z. If the time-frequency resources selected cannot satisfy the time-domain restriction, for example, the interval is short but the number of retransmissions is large, it is up to the UE, and the UE may drop some retransmission resources or deactivate HARQ feedback for some transmissions.

For a DRX mechanism of an LTE system, DRX is designed based on a feedback-based HARQ retransmission mechanism, and therefore, DRX is implemented based on a round trip time (RTT) timer and a retransmission timer (retx timer), that is, the UE does not need to perform DL monitoring before the RTT timer expires, and after expiry of the RTT timer, the UE performs DL monitoring before the retransmission timer expires. In release 16 (R16), a flexible HARQ feedback activation/deactivation mechanism is introduced for SL, that is, whether to feed back is notified to a receiving-end UE based on an indication via SCI.

In an SL system, since a time-frequency resource grant for a transmitting-end UE may come from a network device (mode A), a HARQ feedback activation/deactivation decision depends on the transmitting-end UE, and the network device does not know whether to activate HARQ feedback or to deactivate HARQ feedback, which results in uncertainty regarding time interval of resource scheduling. The network device may tend to reserve enough time interval before providing a retransmission resource in mode A, but this may affect data transmission efficiency. On the other hand, the time-frequency resource grant for the transmitting-end UE may also come from the transmitting-end UE itself (mode B). Since the transmitting-end UE itself knows the HARQ feedback activation/deactivation decision, the transmitting-end UE may select a time-frequency resource to transmit data to the receiving-end UE according to a HARQ feedback activation/deactivation state. However, a Uu-based DRX mechanism is designed for the receiving-end UE, and for the receiving-end UE, how to monitor data on an SL is not yet specified, which affects data transmission efficiency.

Implementations of the disclosure provide a method for data retransmission and related devices, which can reduce power consumption and improve data transmission efficiency.

Figure 4:
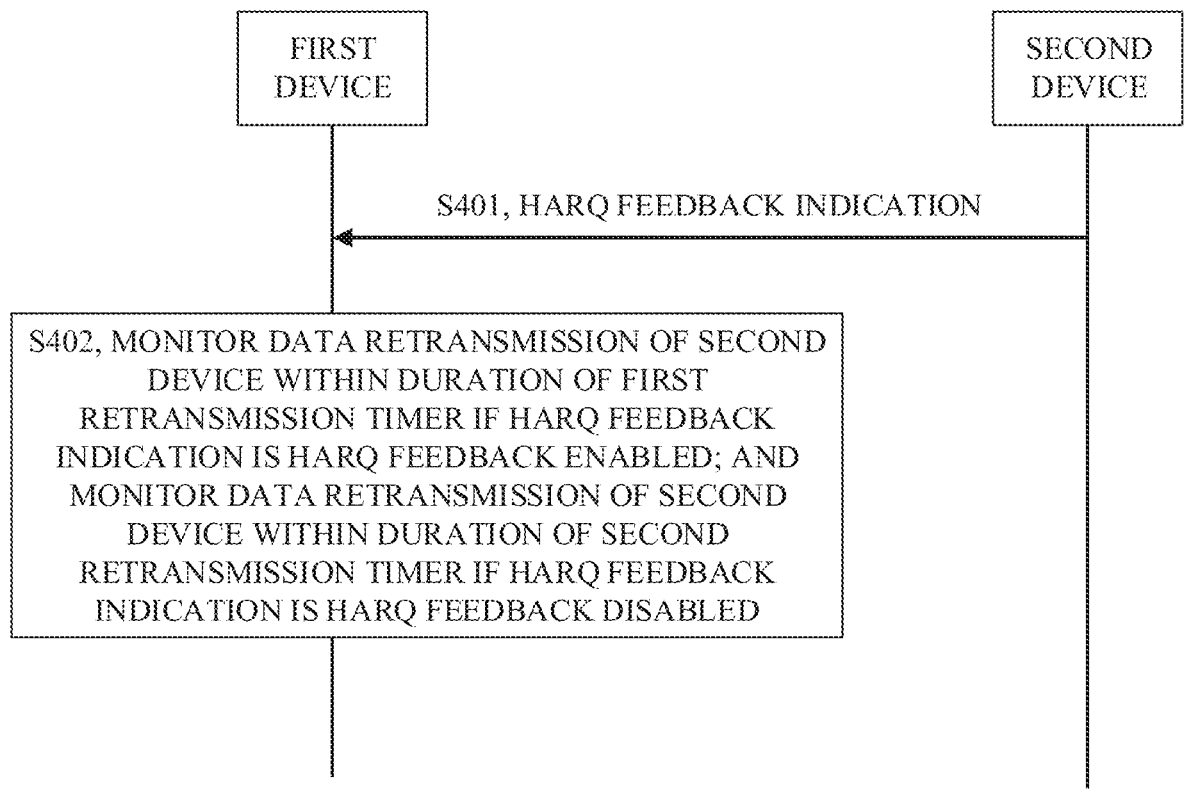
FIG. 4 is a schematic flowchart of a method for data retransmission provided in implementations of the disclosure.

Referring to FIG. 4, FIG. 4 is a schematic flowchart of a method for data retransmission provided in implementations of the disclosure. The method according to implementations of the disclosure at least includes the following.

S401, a second device sends first information to a first device, where the first information includes a HARQ feedback indication.

The first information may be carried in a PSCCH or a PSSCH. The first information may be the HARQ feedback indication, where the HARQ feedback indication may be HARQ feedback enabled or HARQ feedback disabled.

The HARQ feedback indication may indicate whether the second device is to enable or disable HARQ feedback with regard to a specific time-frequency resource, for example, a specific configured grant.

Optionally, before the second device sends the first information to the first device, the first device may pre-configure a duration of a first retransmission timer and a duration of a second retransmission timer. Optionally, the first device may further pre-configure a duration of a first RTT timer and a duration of a second RTT timer.

Optionally, before sending the first information to the first device, the second device may send second information to the first device, where the second information includes the duration of the first retransmission timer and the duration of the second retransmission timer. The second information may further include the duration of the first RTT timer and the duration of the second RTT timer.

Optionally, before the second device sends the first information to the first device, a network device may send configuration information to the first device via a system information block (SIB) or dedicated signaling. The first device receives the configuration information from the network device, where the configuration information includes the duration of the first retransmission timer and the duration of the second retransmission timer. The configuration information may further include the duration of the first RTT timer and the duration of the second RTT timer.

The first device and the second device may each be a terminal device.

S402, if the HARQ feedback indication is HARQ feedback enabled, the first device monitors data retransmission of the second device within the duration of the first retransmission timer. If the HARQ feedback indication is HARQ feedback disabled, the first device monitors the data retransmission of the second device within the duration of the second retransmission timer.

It should be noted that, if the first device fails to receive data sent by the second device or data received by the first device is incorrect, the first device needs to monitor the data retransmission of the second device within the duration of the first retransmission timer or the duration of the second retransmission timer; otherwise, the first device does not need to start the first retransmission timer or the second retransmission timer.

As can be seen, in implementations of the disclosure, in sidelink (SL), the first device (receiving-end user equipment (UE)) can select, according to different HARQ feedback indications, a retransmission timer to monitor the data retransmission of the second device (transmitting-end UE), so that the first device is in a sleep mode before starting the retransmission timer, thereby saving power. By monitoring data retransmission before the retransmission timer expires, it is possible to ensure a success rate of data transmission and improve data transmission efficiency.

Optionally, after sending the first information to the first device, the second device may send data to the first device, where the data is carried in a data channel. If the HARQ feedback indication is HARQ feedback to be enabled, the first device can send feedback information to the second device, where the feedback information may be carried in a physical sidelink feedback channel (PSFCH), and the feedback information may indicate that data transmission fails or indicate the second device to retransmit data. After sending the feedback information to the second device, the first device starts the first RTT timer, and the second device will not retransmit data to the first device within the duration of the first RTT timer, and in this case, the first device can stop monitoring the data retransmission of the second device. After the first RTT timer expires, the second device begins to retransmit data to the first device, and in this case, the first device is woken up and starts the first retransmission timer, and monitors the data retransmission of the second device within the duration of the first retransmission timer. If the data retransmission of the second device is monitored by the first device within the duration of the first retransmission timer, the first device begins to receive the data retransmitted.

Optionally, after sending the first information to the first device, the second device may send data to the first device, where the data is carried in a data channel. If the HARQ feedback indication is HARQ feedback disabled, the first device will not send feedback information to the second device and wait for a first time point to start the second retransmission timer, and monitor the data retransmission of the second device within the duration of the second retransmission timer. The first time point is at least one of: after receiving the first information, after receiving a data channel corresponding to the first information, when a preset time period elapsed after receiving the first information, or when the preset time period elapsed after receiving the data channel corresponding to the first information.

Optionally, if the HARQ feedback indication is HARQ feedback disabled, the first device may start the second RTT timer, and the second device will not retransmit data to the first device within the duration of the second RTT timer, and in this case, the first device can stop monitoring the data retransmission of the second device. After the second RTT timer expires, the first device monitors the data retransmission of the second device within the duration of the second retransmission timer. It should be noted that, the duration of the second RTT timer when HARQ feedback is disabled may be different from or the same as the duration of the first RTT timer when HARQ feedback is enabled. The duration of the first RTT timer and the duration of the second RTT timer may be set based on the same timer, or may be set based on different timers.

Optionally, the second device may retransmit data on SL on a time-frequency resource allocated by the network device, or may select a time-frequency resource from a resource pool for data retransmission.

It should be noted that, the duration of the first retransmission timer and the duration of the second retransmission timer may be set based on one retransmission timer according to different HARQ feedback indications. Alternatively, the duration of the first retransmission timer and the duration of the second retransmission timer may be set respectively based on two retransmission timers according to different HARQ feedback indications, where the duration of the first retransmission timer is set based on one of the two retransmission timers, and the duration of the second retransmission timer is set based on the other one of the two retransmission timers.

Optionally, the duration of the first retransmission timer is different from the duration of the second retransmission timer, and specifically, the duration of the second retransmission timer is greater than the duration of the first retransmission timer. If HARQ feedback is disabled, the second device will not receive feedback information sent by the first device, and the second device or the network device is unable to determine whether to send a retransmission resource or determine an occasion for sending the retransmission resource. Therefore, the duration of the second retransmission timer can be set to be long, so that the retransmission resource sent by the second device can be monitored by the first device within the duration of the second retransmission timer. If HARQ feedback is enabled, the second device can send the retransmission resource after receiving the feedback information, and therefore, the duration of the first retransmission timer may be set to be short to save power.

Optionally, the duration of the second retransmission timer may be equal to the duration of the first retransmission timer. Alternatively, the duration of the second retransmission timer may be less than the duration of the first retransmission timer. There is no limitation on the duration of the first retransmission timer and the duration of the second retransmission timer in the disclosure.

In implementations of the disclosure, in SL, the first device (receiving-end UE) may select, according to different HARQ feedback indications, the duration of the first retransmission timer or the duration of the second retransmission timer to monitor the data retransmission of the second device (transmitting-end UE), so that the first device is in a sleep mode before starting the retransmission timer, thereby saving power. On the other hand, by monitoring data retransmission before the retransmission timer expires, it is possible to ensure a success rate of data transmission, thereby improving data transmission efficiency.

Figure 5:
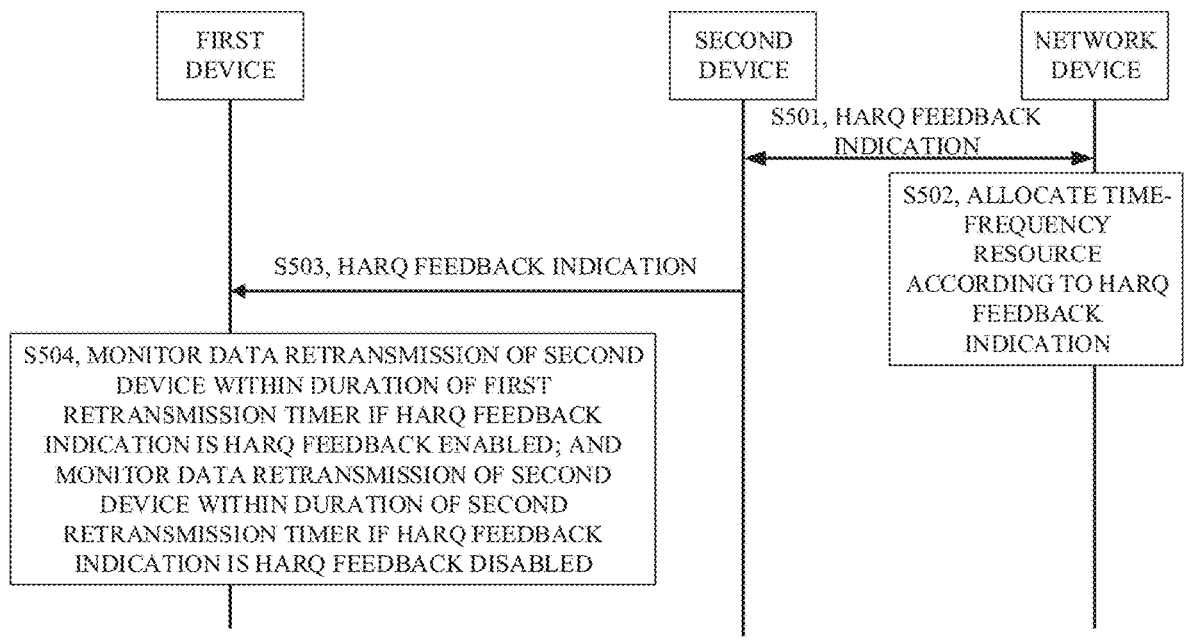
FIG. 5 is a schematic flowchart of another method for data retransmission provided in implementations of the disclosure.

Referring to FIG. 5, FIG. 5 is a schematic flowchart of another method for data retransmission provided in implementations of the disclosure. The method according to implementations of the disclosure at least includes the following.

S501, a network device receives a HARQ feedback indication from a second device, or sends a HARQ feedback indication to the second device.

S502, the network device allocates a time-frequency resource according to the HARQ feedback indication.

It should be noted that, after communicating the HARQ feedback indication with the second device, the network device can know whether HARQ feedback between a first device and the second device in SL is disabled or is enabled. Since a time interval at which the second device schedules the time-frequency resource depends on whether HARQ feedback is disabled or is enabled, the network device can determine the time interval at which the second device schedules the time-frequency resource, and allocate the time-frequency resource to the second device according to the HARQ feedback indication.

The HARQ feedback indication may indicate whether the second device is to enable or disable HARQ feedback with regard to a specific time-frequency resource, for example, a specific configured grant.

For example, if the HARQ feedback indication is HARQ feedback disabled, a time interval between a time-frequency resource for initial data transmission and a time-frequency resource for data retransmission that are allocated by the network device is long; and if the HARQ feedback indication is HARQ feedback to be enabled, the time interval between the time-frequency resource for initial data transmission and the time-frequency resource for data retransmission that are allocated by the network device is short. Alternatively, if the HARQ feedback indication is HARQ feedback to be disabled, the time interval between the time-frequency resource for initial data transmission and the time-frequency resource for data retransmission that are allocated by the network device is short; and if the HARQ feedback indication is HARQ feedback enabled, the time interval between the time-frequency resource for initial data transmission and the time-frequency resource for data retransmission that are allocated by the network device is long.

In this way, when selecting, by the second device, a time-frequency resource from time-frequency resources allocated by the network device to transmit data to the first device, since the time interval between these time-frequency resources is determined according to the HARQ feedback indication, during data transmission on SL, the second device can select a corresponding time-frequency resource for data transmission, and on the other hand, the first device can configure a corresponding DRX mechanism for data transmission, that is, select different retransmission timers to monitor the data retransmission of the second device.

Optionally, the network device may send a time-frequency resource set to the second device, so that the second device can select a time-frequency resource from the time-frequency resource set to send data to the first device.

Optionally, the network device may send data to the second device. After receiving the data, the second device sends acknowledgement (ACK) information or negative acknowledgement (NACK) information to the network device.

S503, the second device sends first information to the first device, where the first information includes the HARQ feedback indication.

The first information may be carried in a PSCCH or a PSSCH. The first information may be the HARQ feedback indication, where the HARQ feedback indication may be HARQ feedback enabled or HARQ feedback disabled.

Optionally, before the second device sends the first information to the first device, the first device may pre-configure a duration of a first retransmission timer and a duration of a second retransmission timer. Optionally, the first device may further pre-configure a duration of a first RTT timer and a duration of a second RTT timer.

Optionally, before sending the first information to the first device, the second device may send second information to the first device, where the second information includes the duration of the first retransmission timer and the duration of the second retransmission timer. The second information may further include the duration of the first RTT timer and the duration of the second RTT timer.

Optionally, before the second device sends the first information to the first device, the network device may send configuration information to the first device via an SIB or dedicated signaling. The first device receives the configuration information from the network device, where the configuration information includes the duration of the first retransmission timer and the duration of the second retransmission timer. The configuration information may further include the duration of the first RTT timer and the duration of the second RTT timer.

S504, if the HARQ feedback indication is HARQ feedback enabled, the first device monitors data retransmission of the second device within the duration of the first retransmission timer. If the HARQ feedback indication is HARQ feedback disabled, the first device monitors the data retransmission of the second device within the duration of the second retransmission timer.

It should be noted that, if the first device fails to receive data sent by the second device or data received by the first device is incorrect, the first device needs to monitor the data retransmission of the second device within the duration of the first retransmission timer or the duration of the second retransmission timer; otherwise, the first device does not need to start the first retransmission timer or the second retransmission timer.

Optionally, after sending the first information to the first device, the second device may send data to the first device, where the data is carried in a data channel. If the HARQ feedback indication is HARQ feedback enabled, the first device can send feedback information to the second device, where the feedback information may be carried in a PSFCH, and the feedback information may indicate that data transmission fails or indicate the second device to retransmit data. After sending the feedback information to the second device, the first device starts the first RTT timer, and the second device will not retransmit data to the first device within the duration of the first RTT timer, and in this case, the first device can stop monitoring the data retransmission of the second device. After the first RTT timer expires, the second device begins to retransmit data to the first device, and in this case, the first device is woken up and starts the first retransmission timer, and monitors the data retransmission of the second device within the duration of the first retransmission timer. If the data retransmission of the second device is monitored by the first device within the duration of the first retransmission timer, the first device begins to receive the data retransmitted.

Optionally, after sending the first information to the first device, the second device may send data to the first device, where the data is carried in a data channel. If the HARQ feedback indication is HARQ feedback disabled, the first device will not send feedback information to the second device and wait for a first time point to start the second retransmission timer, and monitor the data retransmission of the second device within the duration of the second retransmission timer. The first time point is at least one of: after receiving the first information, after receiving a data channel corresponding to the first information, when a preset time period elapsed after receiving the first information, or when the preset time period elapsed after receiving the data channel corresponding to the first information.

Optionally, if the HARQ feedback indication is HARQ feedback disabled, the first device may start the second RTT timer, and the second device will not retransmit data to the first device within the duration of the second RTT timer, and in this case, the first device can stop monitoring the data retransmission of the second device. After the second RTT timer expires, the first device monitors the data retransmission of the second device within the duration of the second retransmission timer. It should be noted that, the duration of the second RTT timer when HARQ feedback is disabled may be different from or the same as the duration of the first RTT timer when HARQ feedback is enabled. The duration of the first RTT timer and the duration of the second RTT timer may be set based on the same timer, or may be set based on different timers.

Optionally, the second device may retransmit data on SL on a time-frequency resource allocated by the network device, or may select a time-frequency resource from a resource pool for data retransmission.

It should be noted that, the duration of the first retransmission timer and the duration of the second retransmission timer may be set based on one retransmission timer according to different HARQ feedback indications. Alternatively, the duration of the first retransmission timer and the duration of the second retransmission timer may be set respectively based on two retransmission timers according to different HARQ feedback indications, where the duration of the first retransmission timer is set based on one of the two retransmission timers, and the duration of the second retransmission timer is set based on the other one of the two retransmission timers.

Optionally, the duration of the first retransmission timer is different from the duration of the second retransmission timer. The duration of the second retransmission timer is greater than the duration of the first retransmission timer. If HARQ feedback is disabled, the second device will not receive feedback information sent by the first device, and the second device or the network device is unable to determine whether to send a retransmission resource or determine an occasion for sending the retransmission resource. Therefore, the duration of the second retransmission timer can be set to be long, so that the retransmission resource sent by the second device can be monitored by the first device within the duration of the second retransmission timer. If HARQ feedback is enabled, the second device can send the retransmission resource after receiving the feedback information, and therefore, the duration of the first retransmission timer may be set to be short to save power.

Optionally, the duration of the second retransmission timer may be equal to the duration of the first retransmission timer. Alternatively, the duration of the second retransmission timer may be less than the duration of the first retransmission timer. There is no limitation on the duration of the first retransmission timer and the duration of the second retransmission timer in the disclosure.

In implementations of the disclosure, when scheduling an SL resource, since the network device knows whether HARQ feedback is enabled or is disabled, the network device can determine a time interval for resource scheduling, so that the first device can configure a corresponding DRX mechanism to receive data. In addition, in SL, the first device (receiving-end UE) may select, according to different HARQ feedback indications, the duration of the first retransmission timer or the duration of the second retransmission timer to monitor the data retransmission of the second device (transmitting-end UE), so that the first device is in a sleep mode before starting the retransmission timer, thereby saving power. On the other hand, by monitoring data retransmission before the retransmission timer expires, it is possible to ensure a success rate of data transmission, thereby improving data transmission efficiency.

As can be seen from the above, in SL, the first device (receiving-end UE) may select, according to different HARQ feedback indications (the HARQ feedback indication may indicate whether the second device is to enable or disable HARQ feedback with regard to a specific time-frequency resource), the duration of the first retransmission timer or the duration of the second retransmission timer to monitor the data retransmission of the second device (transmitting-end UE). In this way, data retransmission can be implemented based on a feedback-based HARQ. Transmission and reception of the HARQ feedback indication are implemented through dynamic scheduling, that is, the HARQ feedback indication is carried in SCI.

In addition, in data retransmission based on a feedback-based HARQ, the first device (receiving-end UE) of implementations of the disclosure can select, according to different HARQ feedback channel configurations (the HARQ feedback channel configuration can indicate whether a PSFCH is configured), at least one of the duration of the first RTT timer, the duration of the first retransmission timer, the duration of the second RTT timer, or the duration of the second retransmission timer to monitor the data retransmission of the second device (transmitting-end UE). Transmission and reception of the HARQ feedback configuration are implemented through static configuration, which will be described in detail below.

Figure 6:
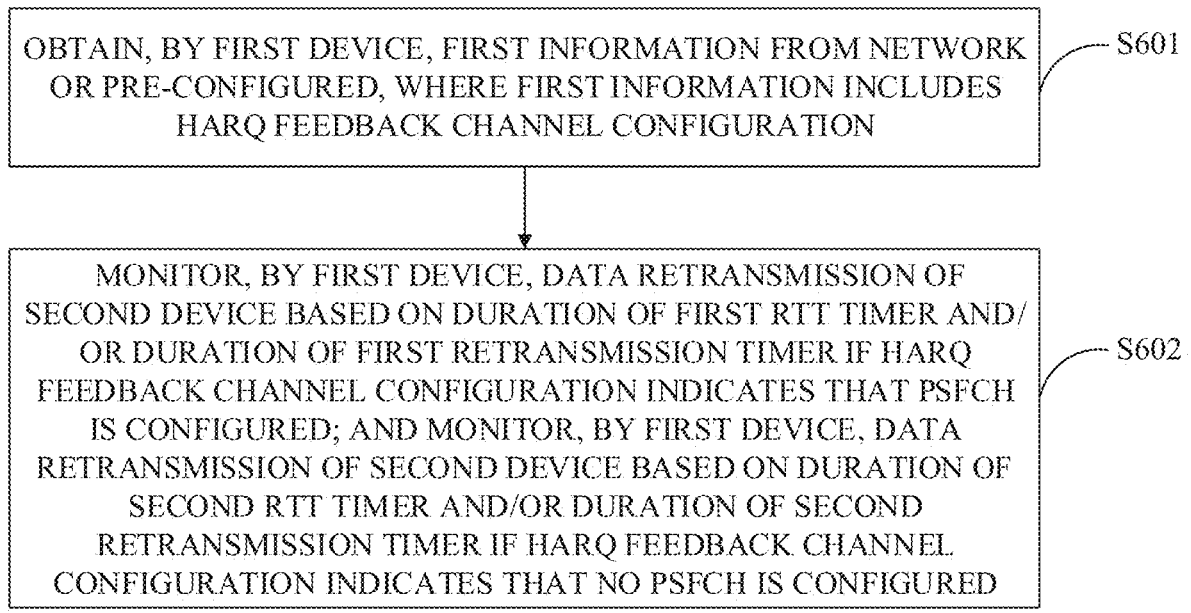
FIG. 6 is a schematic flowchart of another method for data retransmission provided in implementations of the disclosure.

Referring to FIG. 6, FIG. 6 is a schematic flowchart of another method for data retransmission provided in implementations of the disclosure. The method according to implementations of the disclosure at least includes the following.

S601, a first device obtains first information from a network or pre-configured, where the first information includes a HARQ feedback channel configuration.

It should be noted that, as can be seen from the foregoing illustration, a network device may configure a resource pool for SL communication between the first device and a second device during procedures such as cell search, cell access, cell camping, cell re-selection, initial access, random access, cell handover, UL and DL synchronization, and RRC reconfiguration. The resource pool may be configured with a PSFCH, or may be configured with no PSFCH.

If the resource pool is configured with the PSFCH, the first device (receiving-end UE) may feed back, on the PSFCH, whether data transmission fails or whether the second device (transmitting-end UE) needs to retransmit data, which facilitates feedback of a data reception result to a peer end but may result in resource waste.

If the resource pool is not configured with the PSFCH, the first device does not have to feed back the data reception result to the second device, which is beneficial to resource saving, but cannot feed back the data reception result to the peer end.

However, if the first device needs to use the resource pool to receive retransmitted data from the second device, for the first device, there may be a problem regarding how to use an RTT timer or a retransmission timer, for example, the duration required for the RTT timer or the retransmission timer.

To this end, in implementations of the disclosure, whether the resource pool is configured with the PSFCH can be indicated by the first information configured by the network or pre-configured, that is, the HARQ feedback channel configuration in the first information can be indicative of whether the PSFCH is configured. According to different HARQ feedback channel configurations (that is, the resource pool is configured with the PSFCH, or the resource pool is not configured with the PSFCH), a duration of an RTT timer and/or a duration of a retransmission timer can be selected to monitor data retransmission of the second device. The HARQ feedback channel configuration may be that the PSFCH is configured or that no PSFCH is configured, in other words, the HARQ feedback channel configuration indicates that the PSFCH is configured, or indicates that no PSFCH is configured.

In addition, the first information may be configured by the network or pre-configured.

When configuring the first information, the network device may send the first information through static configuration, that is, the first device receives the first information from the network device.

Since transmission and reception of the HARQ feedback channel configuration are implemented through static configuration, the first information (or the HARQ feedback channel configuration) may be carried in high-layer signaling. For example, the higher-layer signaling may be RRC signaling, a media access control-control element (MAC CE), etc.

Optionally, before obtaining the first information, the first device may pre-configure at least one of the duration of the first retransmission timer, the duration of the second retransmission timer, the duration of the first RTT timer, or the duration of the second RTT timer; or at least one of the duration of the first retransmission timer, the duration of the second retransmission timer, the duration of the first RTT timer, or the duration of the second RTT timer may be configured by the network.

For example, during network configuration, the network device may send to the first device information used for configuring at least one of the duration of the first retransmission timer, the duration of the second retransmission timer, the duration of the first RTT timer, or the duration of the second RTT timer during procedures such as cell search, cell access, cell camping, cell re-selection, initial access, random access, cell handover, UL and DL synchronization, RRC reconfiguration, etc. In this way, network configuration of at least one of the duration of the first retransmission timer, the duration of the second retransmission timer, the duration of the first RTT timer, or the duration of the second RTT timer can be realized via the information, where the information may be system information, dedicated information, or high-layer signaling, etc.

For another example, during network configuration, before the second device sends the first information to the first device, the second device may send second information to the first device, where the second information includes at least one of the duration of the first retransmission timer, the duration of the second retransmission timer, the duration of the first RTT timer, or the duration of the second RTT timer.

For another example, before the second device sends the first information to the first device, the network device may send configuration information to the first device via an SIB or dedicated signaling. The first device receives the configuration information from the network device, where the configuration information includes at least one of the duration of the first retransmission timer, the duration of the second retransmission timer, the duration of the first RTT timer, or the duration of the second RTT timer.

The first device and the second device may each be a terminal device.

S602, if the HARQ feedback channel configuration indicates that the PSFCH is configured, the first device monitors the data retransmission of the second device based on the duration of the first RTT timer and/or the duration of the first retransmission timer. If the HARQ feedback channel configuration indicates that no PSFCH is configured, the first device monitors the data retransmission of the second device based on the duration of the second RTT timer and/or the duration of the second retransmission timer.

As can be seen, in implementations of the disclosure, whether the PSFCH is configured is indicated based on a feedback-based HARQ, that is, the HARQ feedback channel configuration is indicative of whether the PSFCH is configured, and accordingly, a duration of an RTT timer and/or a duration of a retransmission timer is selected according to different indications of the HARQ feedback channel configuration (that is, the PSFCH is configured, or the PSFCH is not configured) so as to monitor the data retransmission of the second device, which facilitates data retransmission, ensures a success rate of data transmission, and improves data transmission efficiency.

It should be noted that, if the first device fails to receive data sent by the second device or data received by the first device is incorrect, the second device may be required to retransmit data to the first device. In this case, for data retransmission that is implemented based on a feedback-based HARQ, the first device (receiving-end UE) in implementations of the disclosure may be select, according to different HARQ feedback channel configurations (the HARQ feedback channel configuration can be indicative of whether the PSFCH is configured), at least one of the duration of the first RTT timer, the duration of the first retransmission timer, the duration of the second RTT timer, or the duration of the second retransmission timer to monitor the data retransmission of the second device (transmitting-end UE).

For example, if the HARQ feedback channel configuration indicates that the PSFCH is configured, the first device may monitor the data retransmission of the second device based on the duration of the first RTT timer. Since the second device will not retransmit data to the first device within the duration of the first RTT timer, and in this case, the first device can stop monitoring the data retransmission of the second device, "the first device monitors the data retransmission of the second device based on the duration of the first RTT timer" may mean that the first device starts the first RTT timer, and monitors the data retransmission of the second device after the first RTT timer expires.

For another example, if the HARQ feedback channel configuration indicates that the PSFCH is configured, the first device may monitor the data retransmission of the second device based on the duration of the first retransmission timer. Since the second device can retransmit data to the first device within the duration of the first retransmission timer, "the first device monitors the data retransmission of the second device based on the duration of the first retransmission timer" may mean that the first device starts the first retransmission timer and monitors the data retransmission of the second device within the duration of the first retransmission timer.

For another example, if the HARQ feedback channel configuration indicates that the PSFCH is configured, the first device may monitor the data retransmission of the second device based on the duration of the first RTT timer and the duration of the first retransmission timer. As can be seen from the above, "the first device monitors the data retransmission of the second device based on the duration of the first RTT timer and the duration of the first retransmission timer" may mean that the first device starts the first retransmission timer after the first RTT timer expires, and monitors the data retransmission of the second device within the duration of the first retransmission timer.

Similarly, for example, if the HARQ feedback channel configuration indicates that no PSFCH is configured, the first device may monitor the data retransmission of the second device based on the duration of the second RTT timer. Since the second device will not retransmit data to the first device within the duration of the second RTT timer, and in this case, the first device can stop monitoring the data retransmission of the second device, "the first device monitors the data retransmission of the second device based on the duration of the second RTT timer" may mean that the first device starts the second RTT timer, and monitors the data retransmission of the second device after the second RTT timer expires.

In addition, the duration of the second RTT timer when no PSFCH is configured may be different from or the same as the duration of the first RTT timer when the PSFCH is configured. The duration of the first RTT timer and the duration of the second RTT timer may be set based on the same timer, or may be set based on different timers, which is not specifically limited herein.

For another example, if the HARQ feedback channel configuration indicates that no PSFCH is configured, the first device may monitor the data retransmission of the second device based on the duration of the second retransmission timer. Since the second device can retransmit data to the first device within the duration of the second retransmission timer, "the first device monitors the data retransmission of the second device based on the duration of the second retransmission timer" may mean that the first device starts the second retransmission timer and monitors the data retransmission of the second device within the duration of the second retransmission timer.

In addition, the duration of the second retransmission timer when no PSFCH is configured may be different from or the same as the duration of the first retransmission timer when the PSFCH is configured. The duration of the first retransmission timer and the duration of the second retransmission timer may be set based on the same timer, or may be set based on different timers, which is not specifically limited herein.

For another example, if the HARQ feedback channel configuration indicates that no PSFCH is configured, the first device may monitor the data retransmission of the second device based on the duration of the second RTT timer and the duration of the second retransmission timer. As can be seen from the above, "the first device monitors the data retransmission of the second device based on the duration of the second RTT timer and the duration of the second retransmission timer" may mean that the first device starts the second retransmission timer after the second RTT timer expires, and monitors the data retransmission of the second device within the duration of the second retransmission timer.

The duration of the first retransmission timer and the duration of the second retransmission timer will be described in detail below.

In some possible designs, the duration of the first retransmission timer is different from the duration of the second retransmission timer.

For example, the duration of the first retransmission timer may be greater than the duration of the second retransmission timer.

The reason is that from the perspective of the second device (transmitting-end UE), a duration of a retransmission timer may be understood as a time interval between a current data transmission and a next data transmission (between two data transmissions) of the second device. If the PSFCH is configured, there is a feedback result on the PSFCH between the two data transmissions. In this case, the second device (transmitting-end UE) needs to wait for the feedback result on the PSFCH, and then determines, according to the feedback result, whether data retransmission is needed. Due to delays in waiting for the feedback result and processing the feedback result by the second device (transmitting-end UE), the time interval between the two data transmissions needs to be prolonged, that is, the duration of the retransmission timer is increased, which is conducive to ensuring that the data retransmission of the second device can be monitored within the duration of the retransmission timer.

Similarly, if no PSFCH is configured, there is no feedback result on the PSFCH between the two data transmissions. In this case, the time interval between the two data transmissions can be shortened, that is, the duration of the retransmission timer is short, which is conducive to reducing power consumption during monitoring of the first device within the duration of the retransmission timer, thereby achieving power saving.

As can be seen, whether the PSFCH is configured has some influence on the configuration of the duration of the retransmission timer.

In some possible designs, the duration of the second retransmission timer may be equal to the duration of the first retransmission timer, which is conducive to diversity and flexibility of configuring the duration of the retransmission timer and conducive to ensuring flexibility of a communication procedure.

The duration of the first RTT timer and the duration of the second RTT timer will described in detail below.

In some possible designs, the duration of the first RTT timer is different from the duration of the second RTT timer.

For example, the duration of the first RTT timer may be greater than the duration of the second RTT timer.

The reason is that, similar to the foregoing illustration, from the perspective of the second device (transmitting-end UE), a duration of an RTT timer may be understood as a time interval between a current data transmission and a next data transmission (between two data transmissions) of the second device. If the PSFCH is configured, there is a feedback result on the PSFCH between the two data transmissions. In this case, the second device (transmitting-end UE) needs to wait for the feedback result on the PSFCH, and then determines, according to the feedback result, whether data retransmission is needed. Due to some delays in waiting for the feedback result and processing the feedback result by the second device (transmitting-end UE), the time interval between the two data transmissions needs to be prolonged, that is, the duration of the RTT timer is increased, which is conducive to ensuring that a time interval is reserved as long as possible for data result feedback and data processing, thereby ensuring robustness and reliability of communication.

Similarly, if no PSFCH is configured, there is no feedback result on the PSFCH between the two data transmissions, and in this case, the time interval (the shortest time interval) between the two data transmissions may be shortened, that is, the duration of the RTT timer is short, which is conducive to reducing unnecessary waiting as much as possible, thereby improving communication efficiency.

As can be seen, whether the PSFCH is configured has some influence on the configuration of the duration of the RTT timer.

In some possible designs, the duration of the second RTT timer may be equal to the duration of the first RTT timer, which is conducive to diversity and flexibility of configuring the duration of the RTT timer and conducive to ensuring flexibility of a communication procedure.

It can be understood that, in each of the foregoing method implementations, methods and operations implemented by a terminal device (for example, the first device or the second device) may also be implemented by a component (for example, a chip or a circuit) operable with the terminal device, and methods and operations implemented by the network device may also be implemented by a component (for example, a chip or a circuit) operable with the network device.

The solutions provided in implementations of the disclosure are introduced mainly from the perspective of interaction between network elements. It can be understood that, in order to implement the foregoing functions, various network elements, such as a transmitting-end device or a receiving-end device, include corresponding hardware structures and/or software modules for executing respective functions. Those of ordinary skill in the art will appreciate that units and algorithmic operations of various examples described in connection with implementations herein may be implemented by hardware or by a combination of hardware and computer software. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

In implementations of the disclosure, division of functional modules of a transmitting-end device or a receiving-end device may be implemented according to the foregoing method examples. For example, functional modules may be divided to correspond to respective functions, or two or more functions may be integrated into one processing module. The integrated module may be implemented in a form of hardware, or may be implemented in a form of software program module. It should be noted that, the division of modules in implementations of the disclosure is illustrative and is only a division of logical functions, and other manners of division may also available in practice. The following will take division of functional modules with regard to corresponding functions as an example for illustration.

The method provided in implementations of the disclosure is described in detail above with reference to FIG. 4 to FIG. 6, and an apparatus for data retransmission provided in implementations of the disclosure will be described in detail below with reference to FIG. 7 to FIG. 10. It should be understood that, illustrations of apparatus implementations and illustrations of method implementations correspond to each other, and therefore, for parts not described in detail, reference can be made to the foregoing method implementations, which will not be described in detail again herein for the sake of brevity.

Figure 7:
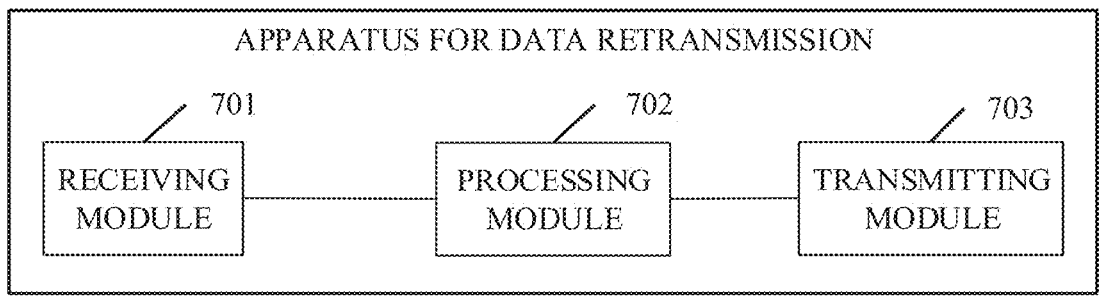
FIG. 7 is a schematic structural diagram of an apparatus for data retransmission provided in implementations of the disclosure.

Referring to FIG. 7, FIG. 7 is a schematic structural diagram of an apparatus for data retransmission provided in implementations of the disclosure. The apparatus may include a receiving module 701 and a transmitting module 703, and optionally, may further include a processing module 702. The receiving module 701 and the transmitting module 703 may be configured to communicate with the outside, and the processing module 702 is configured for processing, for example, monitor data retransmission with a retransmission timer. The receiving module 701 and the transmitting module 703 may also be referred to as a communication interface, a transceiver unit, or a transceiver module. The receiving module 701 and the transmitting module 703 may be configured to execute actions executed by the first device in the foregoing method implementations.

For example, the receiving module 701 and the transmitting module 703 may also be referred to as a transceiver module or a transceiver unit (including a receiving unit and/or a transmitting unit), and are configured to execute reception and transmission of the first device respectively in the foregoing method implementations.

In a possible design, the apparatus may implement steps or processes executed by the first device in the foregoing method implementations, and may be, for example, the first device, or a chip or circuit configured in the first device. The receiving module 701 and the transmitting module 703 are configured to execute transmission and reception operations of the first device in the foregoing method implementations, and the processing module 702 is configured to execute processing operations of the first device in the foregoing method implementations.

The receiving module 701 is configured to receive first information from a second device, where the first information includes a HARQ feedback indication. The processing module 702 is configured to monitor data retransmission of the second device within a duration of a first retransmission timer if the HARQ feedback indication is HARQ feedback enabled; and monitor the data retransmission of the second device within a duration of a second retransmission timer if the HARQ feedback indication is HARQ feedback disabled.

Optionally, the duration of the first retransmission timer is different from the duration of the second retransmission timer.

Optionally, the duration of the second retransmission timer is greater than the duration of the first retransmission timer.

Optionally, the duration of the first retransmission timer is the same as the duration of the second retransmission timer.

Optionally, the duration of the first retransmission timer and the duration of the second retransmission timer are pre-configured.

Optionally, the receiving module 701 is further configured to receive second information from the second device, where the second information includes the duration of the first retransmission timer and the duration of the second retransmission timer.

Optionally, the receiving module 701 is further configured to receive configuration information from a network device, where the configuration information includes the duration of the first retransmission timer and the duration of the second retransmission timer.

Optionally, the transmitting module 703 is configured to send feedback information to the second device. The processing module 702 is further configured to start a first RTT timer, and monitor the data retransmission of the second device within the duration of the first retransmission timer after the first RTT timer expires.

Optionally, the processing module 702 is further configured to monitor the data retransmission of the second device within the duration of the second retransmission timer started at a first time point.

Optionally, the first time point is at least one of: after receiving the first information, after receiving a data channel corresponding to the first information, when a preset time period elapsed after receiving the first information, or when the preset time period elapsed after receiving the data channel corresponding to the first information.

Optionally, the processing module 702 is further configured to start a second RTT timer, and monitor the data retransmission of the second device within the duration of the second retransmission timer after the second RTT timer expires.

It should be noted that, for the implementation of each module, reference can be made to corresponding illustrations in the method implementations illustrated in FIG. 4 and FIG. 5, to implement methods and functions executed by the first device in the foregoing implementations.

Figure 8:
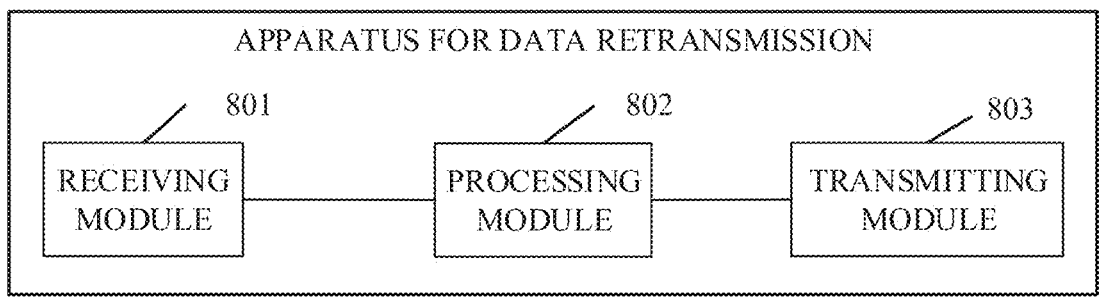
FIG. 8 is a schematic structural diagram of another apparatus for data retransmission provided in implementations of the disclosure.

Referring to FIG. 8, FIG. 8 is a schematic structural diagram of another apparatus for data retransmission provided in implementations of the disclosure. The apparatus may include a receiving module 801 and a transmitting module 803, and optionally, may further include a processing module 802. The receiving module 801 and the transmitting module 803 may be configured to communicate with the outside, and the processing module 802 is configured for processing, for example, monitor data retransmission with a retransmission timer. The receiving module 801 and the transmitting module 803 may also be referred to as a communication interface, a transceiver unit, or a transceiver module. The receiving module 801 and the transmitting module 803 may be configured to execute actions executed by the second device in the foregoing method implementations.

For example, the receiving module 801 and the transmitting module 803 may also be referred to as a transceiver module or a transceiver unit (including a receiving unit and/or a transmitting unit), and are configured to execute reception and transmission of the second device respectively in the foregoing method implementations.

In a possible design, the apparatus may implement steps or processes executed by the second device in the foregoing method implementations, for example, the apparatus may be the second device, or a chip or circuit configured in the second device. The receiving module 801 and the transmitting module 803 are configured to execute transmission and reception operations of the second device in the foregoing method implementations, and the processing module 802 is configured to execute processing operations of the second device in the foregoing method implementations.

The processing module 802 is configured to determine a HARQ feedback indication. The transmitting module 803 is configured to send first information to a first device, where the first information includes the HARQ feedback indication. If the HARQ feedback indication is HARQ feedback enabled, HARQ feedback enabled indicates to monitor data retransmission of a second device within a duration of a first retransmission timer. If the HARQ feedback indication is HARQ feedback disabled, HARQ feedback disabled indicates to monitor the data retransmission of the second device within a duration of a second retransmission timer.

Optionally, the duration of the first retransmission timer is different from the duration of the second retransmission timer.

Optionally, the duration of the second retransmission timer is greater than the duration of the first retransmission timer.

Optionally, the duration of the first retransmission timer is the same as the duration of the second retransmission timer.

Optionally, the receiving module 801 is configured to receive the HARQ feedback indication from a network device.

Optionally, the transmitting module 803 is further configured to send the HARQ feedback indication to the network device.

Optionally, the transmitting module 803 is further configured to send second information to the first device, where the second information includes the duration of the first retransmission timer and the duration of the second retransmission timer.

It should be noted that, for the implementation of each module, reference can be made to corresponding illustrations in the method implementations illustrated in FIG. 4 and FIG. 5, to implement methods and functions executed by the second device in the foregoing implementations.

Figure 9:
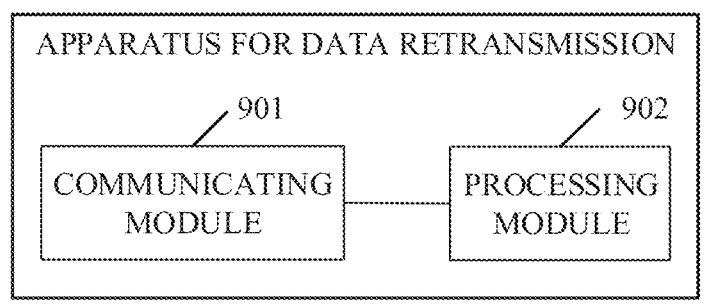
FIG. 9 is a schematic structural diagram of another apparatus for data retransmission provided in implementations of the disclosure.

Referring to FIG. 9, FIG. 9 is a schematic structural diagram of another apparatus for data retransmission provided in implementations of the disclosure. The apparatus may include a communicating module 901 and a processing module 902. The communicating module 901 may be configured to communicate with the outside, and the processing module 902 is configured for processing, for example, allocate a time-frequency resource. The communicating module 901 may also be referred to as a communications interface, a transceiver module, or a transceiver unit. The communicating module 901 may be configured to execute actions executed by the network device in the foregoing method implementations.

For example, the communicating module 901 may also be referred to as a transceiver module or a transceiver unit (including a transmitting unit and/or a receiving unit), and is configured to perform transmission and reception of network device respectively in the foregoing method implementations.

In a possible design, the apparatus may implement steps or processes executed by the network device in the foregoing method implementations, for example, the apparatus may be the network device, or a chip or circuit configured in the network device. The communicating module 901 is configured to perform transmission and reception operations of the network-device side in the foregoing method implementations, and the processing module 902 is configured to perform processing operations of the network device in the foregoing method implementations.

The communicating module 901 is configured to receive a HARQ feedback indication from a second device, or send a HARQ feedback indication to the second device. The processing module 902 configured to allocate a time-frequency resource according to the HARQ feedback indication.

The HARQ feedback indication indicates whether the second device is to enable or disable HARQ feedback with regard to a specific time-frequency resource.

It should be noted that, for the implementation of each module, reference can be made to corresponding illustrations in the method implementations illustrated in FIG. 4 and FIG. 5, to implement methods and functions executed by the network device in the foregoing implementations.

Figure 10:
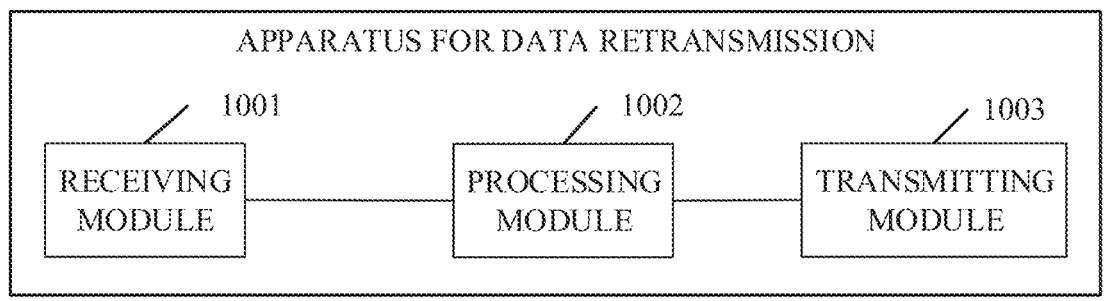
FIG. 10 is a schematic structural diagram of another apparatus for data retransmission provided in implementations of the disclosure.

Referring to FIG. 10, FIG. 10 is a schematic structural diagram of another apparatus for data retransmission provided in implementations of the disclosure. The apparatus may include a receiving module 1001 and a transmitting module 1003, and optionally, may further include a processing module 1002. The receiving module 1001 and the transmitting module 1003 may be configured to communicate with the outside, and the processing module 1002 is configured for processing, for example, monitor data retransmission with a retransmission timer. The receiving module 1001 and the transmitting module 1003 may also be referred to as a communication interface, a transceiver unit, or a transceiver module. The receiving module 1001 and the transmitting module 1003 may be configured to execute actions executed by the first device in the foregoing method implementations.

For example, the receiving module 1001 and the transmitting module 1003 may also be referred to as a transceiver module or a transceiver unit (including a receiving unit and/or a transmitting unit), and are configured to execute reception and transmission of the first device respectively in the foregoing method implementations.

In a possible design, the apparatus may implement steps or processes executed by the first device in the foregoing method implementations, and may be, for example, the first device, or a chip or circuit configured in the first device. The receiving module 1001 and the transmitting module 1003 are configured to execute transmission and reception operations of the first device in the foregoing method implementations, and the processing module 1002 is configured to execute processing operations of the first device in the foregoing method implementations.

The receiving module 1001 is configured to receive first information from a network or pre-configured, where the first information includes a HARQ feedback channel configuration. The processing module 1002 is configured to monitor data retransmission of a second device based on a duration of a first RTT timer and/or a duration of a first retransmission timer when the HARQ feedback channel configuration indicates that a PSFCH is configured; and monitor the data retransmission of the second device based on a duration of a second RTT timer and/or a duration of a second retransmission timer when the HARQ feedback channel configuration indicates that no PSFCH is configured.

It should be noted that, for the implementation of each module, reference can be made to corresponding illustrations in the method implementations illustrated in FIG. 6, to implement methods and functions executed by the first device in the foregoing implementations.

Figure 11:
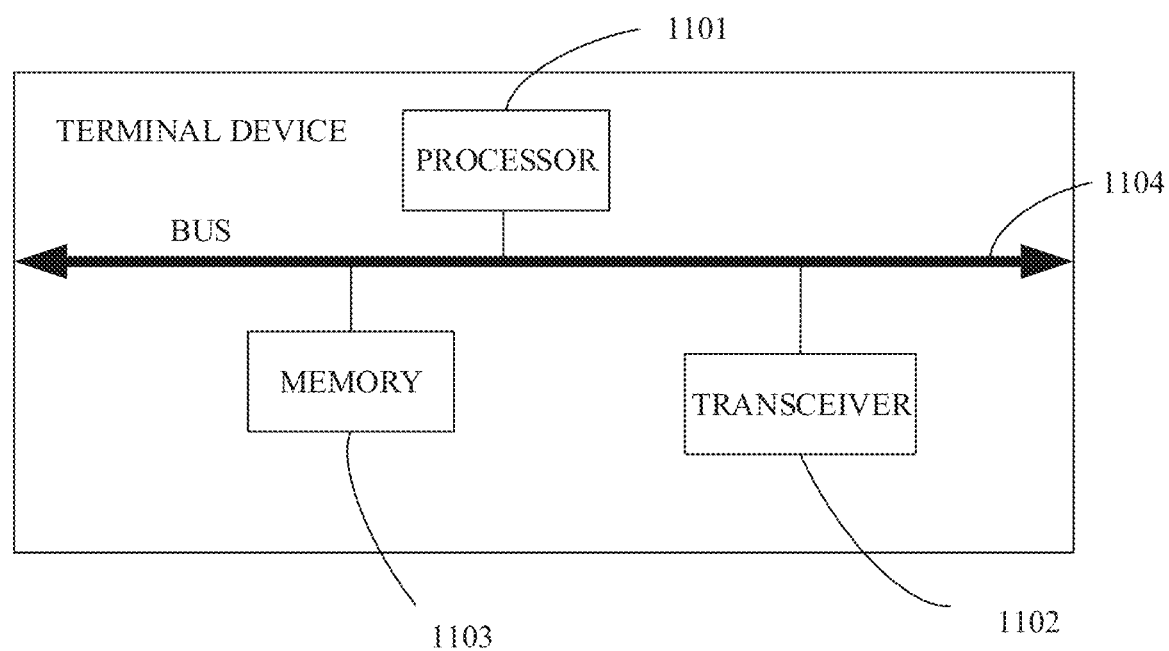
FIG. 11 is a schematic structural diagram of a terminal device provided in implementations of the disclosure.

FIG. 11 is a schematic structural diagram of a terminal device provided in implementation of the disclosure. The terminal device can be applied to the system illustrated in FIG. 1, and implement functions of the first device or the second device in the foregoing method implementations or perform steps or processes performed by the first device or the second device in the foregoing method implementations.

As illustrated in FIG. 11, the terminal device includes a processor 1101 and a transceiver 102. Optionally, the terminal device further includes a memory 1103. The processor 1101, the transceiver 1102, and the memory 1103 may communicate with each other through an internal connection path to transmit control signals and/or data signals. The memory 1103 is configured to store computer programs. The processor 1101 is configured to invoke and execute the computer programs stored in the memory 1103 to control the transceiver 1102 to receive and transmit signals. Optionally, the terminal device can further include an antenna. The antenna is configured to send, via a radio signal, UL data or UL control signaling output by the transceiver 1102.

The processor 1101 and the memory 1103 above may be combined into a processing apparatus, and the processor 1101 is configured to execute program codes stored in the memory 1103 to implement the foregoing functions. During implementation, the memory 1103 may also be integrated in the processor 1101, or be independent of the processor 1101. The processor 1101 may correspond to the processing module in FIG. 7, FIG. 8, or FIG. 10.

The transceiver 1102 may correspond to the receiving module and the transmitting module in FIG. 7, FIG. 8, or FIG. 10, and may also be referred to as a transceiver unit or a transceiver module. The transceiver 1102 may include a receiver (or referred to as a receiver, a receiving circuit) and a transmitter (or referred to as a transmitter, a transmitting circuit). The receiver is configured to receive a signal, and the transmitter is configured to transmit the signal.

It should be understood that, the terminal device illustrated in FIG. 11 can implement various processes involving the first device or the second device in the method implementations illustrated in FIG. 4, FIG. 5 or FIG. 6. Operations and/or functions of various modules in the terminal device are intended to implement corresponding processes in the foregoing method implementations. For details thereof, reference can be made to the illustrations in the foregoing method implementations, and detailed elaborations are properly omitted herein to avoid repetition.

The processor 1101 may be configured to execute actions that are implemented inside the terminal device described in the foregoing method implementations, and the transceiver 1102 may be configured to execute actions of transmission and reception of the first device or the second device and described in the foregoing method implementations. For details thereof, reference can be made to the illustrations in the foregoing method implementations, which will not be described in detail again herein.

The processor 1101 may be a central processing unit, a general-purpose processor, a digital signal processor, an application-specific integrated circuit, a field programmable gate array, or other programmable logic devices, transistor logic devices, hardware components, or any combination thereof. It may implement or perform various illustrative logical blocks, modules, and circuits described in connection with the disclosure. The processor 1101 may also be a combination that implements a computing function, for example, a combination that includes one or more microprocessors, a combination of digital signal processor and microprocessor, and the like. A communication bus 1104 may be a peripheral component interconnect (PCI) bus, an extended industry standard architecture (EISA) bus, or the like. The bus may be classified into an address bus, a data bus, a control bus, and the like. For the ease of illustration, only one thick line is used in FIG. 11 for illustration, but does not mean that there is only one bus or one type of bus. The communication bus 1104 is configured to implement connection and communication between these components. The transceiver 1102 in implementations of the disclosure is configured to perform signaling communication or data communication with another node device. The memory 1103 may include a volatile memory, such as a nonvolatile random access memory (NVRAM), a phase change RAM (PRAM), a magnetoresistive RAM (MRAM), etc.; and may further include a non-volatile memory, for example, at least one magnetic disk storage device, an electrically erasable programmable read-only memory (EEPROM), a flash memory device such as a NOR flash memory or a NAND flash memory, a semiconductor device such as a solid state disk (SSD), etc. Optionally, the memory 1103 may also be at least one storage apparatus located far away from the processor 1101. Optionally, the memory 1103 may be further configured to store a set of computer program codes or configuration information. Optionally, the processor 1101 may be further configured to execute programs stored in the memory 1103. The processor may cooperate with the memory and the transceiver to execute any one of the methods and functions of the terminal device in the foregoing implementations of the disclosure.

Figure 12:
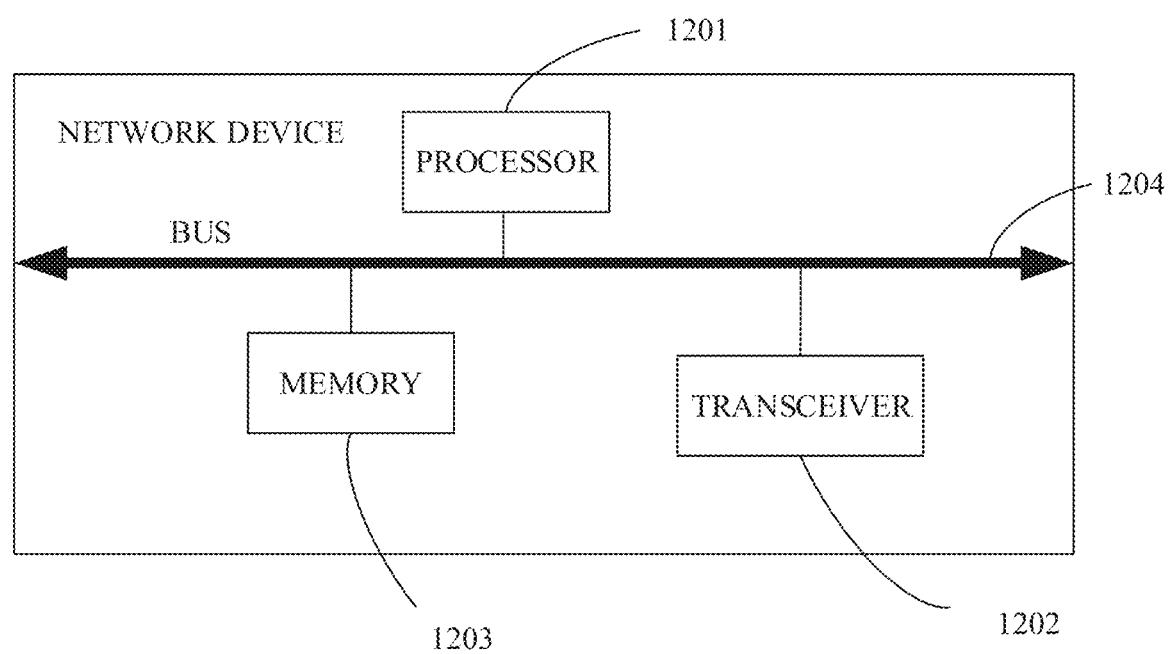
FIG. 12 is a schematic structural diagram of a network device provided in implementations of the disclosure.

FIG. 12 is a schematic structural diagram of a network device provided in implementations of the disclosure. The network device may be applied to the system illustrated in FIG. 1, and implement functions of the network device in the foregoing method implementations or perform steps or processes performed by the network device in the foregoing method implementations.

As illustrated in FIG. 12, the network device includes a processor 1201 and a transceiver 1202. Optionally, the network device further includes a memory 1203. The processor 1201, the transceiver 1202, and the memory 1203 may communicate with each other through an internal connection path to transmit control signals and/or data signals. The memory 1203 is configured to store computer programs. The processor 1201 is configured to invoke and execute the computer programs stored in the memory 1203 to control the transceiver 1202 to receive and transmit signals. Optionally, the network device can further include an antenna. The antenna is configured to send, via a radio signal, UL data or UL control signaling output by the transceiver 1202.

The processor 1201 and the memory 1203 may be combined into a processing apparatus, and the processor 1201 is configured to execute program codes stored in the memory 1203 to implement the foregoing functions. During implementation, the memory 1203 may also be integrated in the processor 1201, or be independent of the processor 1201. The processor 1201 may correspond to the processing module in FIG. 9.

The transceiver 1202 may correspond to the communicating module in FIG. 9, and may also be referred to as transceiver unit or transceiver module. The transceiver 1202 may include a receiver (or referred to as a receiver, a receiving circuit) and a transmitter (or referred to as a transmitter, a transmitting circuit). The receiver is configured to receive a signal, and the transmitter is configured to transmit the signal.

It should be understood that, the network device illustrated in FIG. 12 can implement various processes involving the network device in the method implementations illustrated in FIG. 4 to FIG. 5. Operations and/or functions of various modules in the network device are intended to implement corresponding processes in the foregoing method implementations. For details thereof, reference can be made to the illustrations in the foregoing method implementations, and detailed elaborations are properly omitted herein to avoid repetition.

The processor 1201 may be configured to execute the actions implemented by the network device in the foregoing method implementations, and the transceiver 1202 may be configured to execute the actions of transmission to the terminal device by the network device or reception from the terminal device by the network device in the foregoing method implementations. For details thereof, reference can be made to the illustrations in the foregoing method implementations, which will not be described in detail again herein.

The processor 1201 may be various types of processors mentioned above. A communication bus 1204 may be a PCI bus, an EISA bus, or the like. The bus may be classified into an address bus, a data bus, a control bus, and the like. For the ease of illustration, only one thick line is used in FIG. 12 for illustration, but does not mean that there is only one bus or one type of bus. The communication bus 1204 is configured to implement connection and communication between these components. The transceiver 1202 of the device in implementations of the disclosure is configured to perform signaling communication or data communication with other devices. The memory 1203 may be various types of memories mentioned above. Optionally, the memory 1203 may also be at least one storage apparatus located far away from the processor 1201. The memory 1203 is configured to store a set of computer program codes or configuration information, and the processor 1201 is configured to execute programs in the memory 1203. The processor can cooperate with the memory and the transceiver to execute any one of the methods and functions of the network device in the foregoing implementations of the disclosure.

Implementations of the disclosure further provide a system-on-chip (SOC). The SOC includes a processor. The processor is configured to support a terminal device or a network device to realize functions involved in any one of the foregoing implementations, for example, generate or process a HARQ feedback indication involved in the foregoing method. In a possible design, the SOC can further include a memory. The memory is configured to store program instructions and data that are necessary for a terminal device or a network device. The SOC may be consist of a chip, or may include a chip as well as other discrete components. Input and output of the SOC respectively correspond to reception operations and transmission operations of a terminal device or a network device in the method implementations.

Based on the method provided in implementations of the disclosure, a computer program product is further provided in the disclosure. The computer program includes computer programs which, when executed by a computer, are operable with the computer to perform the method of any one of the implementations illustrated in FIG. 4 to FIG. 6.

Based on the method provided in implementations of the disclosure, a computer-readable medium is further provided in the disclosure. The computer-readable medium is configured to store computer programs which, when executed by a computer, are operable with the computer to implement the method in any one of the implementations illustrated in FIG. 4 to FIG. 6.

Based on the method provided in implementations of the disclosure, a system is further provided in the disclosure. The system includes the first device, second device, and one or more network devices.

All or some of the foregoing implementations can be implemented through software, hardware, firmware, or any other combination thereof. When implemented by software, all or some of the foregoing implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data retransmission, comprising:
   receiving, by a first device, first information from a network or pre-configured, the first information comprising a hybrid automatic repeat request (HARQ) feedback channel configuration; and
   monitoring, by the first device, data retransmission of a second device based on a duration of a first round trip time (RTT) timer, when the HARQ feedback channel configuration indicates that a physical sidelink feedback channel (PSFCH) is configured;
   and monitoring, by the first device, the data retransmission of the second device based on a duration of a second RTT timer, when the HARQ feedback channel configuration indicates that no PSFCH is configured.

2. The method of claim 1, wherein receiving, by the first device, the first information from the network comprises:
   receiving, by the first device, the first information from a network device.

3. The method of claim 1, wherein the duration of the first retransmission timer is different from the duration of the second retransmission timer.

4. The method of claim 1, wherein the duration of the first retransmission timer is the same as the duration of the second retransmission timer.

5. The method of claim 1, wherein the duration of the first RTT timer is different from the duration of the second RTT timer.

6. The method of claim 1, wherein the duration of the first RTT timer is the same as the duration of the second RTT timer.

7. The method of claim 1, wherein the duration of the first retransmission timer and the duration of the second retransmission timer are pre-configured.

8. The method of claim 1, wherein the duration of the first RTT timer and the duration of the second RTT timer are pre-configured.

9. The method of claim 1, further comprising:
receiving, by the first device, second information from the second device, wherein the second information comprises at least one of the duration of the first retransmission timer, the duration of the second retransmission timer, the duration of the first RTT timer, or the duration of the second RTT timer.

10. The method of claim 1, further comprising:
receiving, by the first device, configuration information from the network device, wherein the configuration information comprises at least one of the duration of the first retransmission timer, the duration of the second retransmission timer, the duration of the first RTT timer, or the duration of the second RTT timer.

11. An apparatus for data retransmission, comprising:
a processor;
a transceiver; and
a memory configured to store program codes which, when executed by the processor, are operable with the processor to:
cause the transceiver to receive first information from a network or pre-configured, the first information comprising a hybrid automatic repeat request (HARQ) feedback channel configuration; and
monitor data retransmission of a second device based on a duration of a first round trip time (RTT) timer and/or a duration of a first retransmission timer, when the HARQ feedback channel configuration indicates that a physical sidelink feedback channel (PSFCH) is configured; and monitor the data retransmission of the second device based on a duration of a second RTT timer and/or a duration of a second retransmission timer, when the HARQ feedback channel configuration indicates that no PSFCH is configured.

12. The apparatus of claim 11, wherein the transceiver is caused to receive the first information from a network device.

13. The apparatus of claim 11, wherein the duration of the first retransmission timer is different from the duration of the second retransmission timer.

14. The apparatus of claim 11, wherein the duration of the first retransmission timer is the same as the duration of the second retransmission timer.

15. The apparatus of claim 11, wherein the duration of the first RTT timer is different from the duration of the second RTT timer.

16. The apparatus of claim 11, wherein the duration of the first RTT timer is the same as the duration of the second RTT timer.

17. The apparatus of claim 11, wherein the transceiver is caused to:
receive second information from the second device, wherein the second information comprises at least one of the duration of the first retransmission timer, the duration of the second retransmission timer, the duration of the first RTT timer, or the duration of the second RTT timer.

* * * * *